R. Laporta,
Horseshoe.
N° 84,834. Patented Dec. 8, 1868.

Witnesses;
S. Solomon
A. Schuber

Inventor;
R. Laporta

United States Patent Office.

RUDOLPH LAPORTÀ, OF NEW YORK, N. Y.

Letters Patent No. 84,834, dated December 8, 1868.

---

IMPROVEMENT IN HORSE-SHOES.

---

The Schedule referred to in these Letters Patent and making part of the same.

---

*To all whom it may concern:*

Be it known that I, RUDOLPH LAPORTÀ, of the city, county, and State of New York, have invented a new and useful Improvement in Horse-Shoes; and I do hereby declare that the following is a full and exact description thereof, reference being had to the accompanying drawings, and to the letters of reference marked thereon.

The object of my invention is to provide the shoe of a horse or other animal with calks that are independent of the shoe, and so constructed and applied to the shoe, that the tendency is to expand the shoe at the heel, instead of contracting it, as in the common method, and can be readily attached to or detached from the shoe without injury to the shoe or hoof of the animal; and It consists of devices used in combination and attached to a common shoe.

To enable others skilled in the art to make and use my invention, I will proceed to describe its construction and operation.

A represents a common shoe without calks, and attached to the foot of a horse, in the ordinary manner, by means of nails B.

Figure 1:
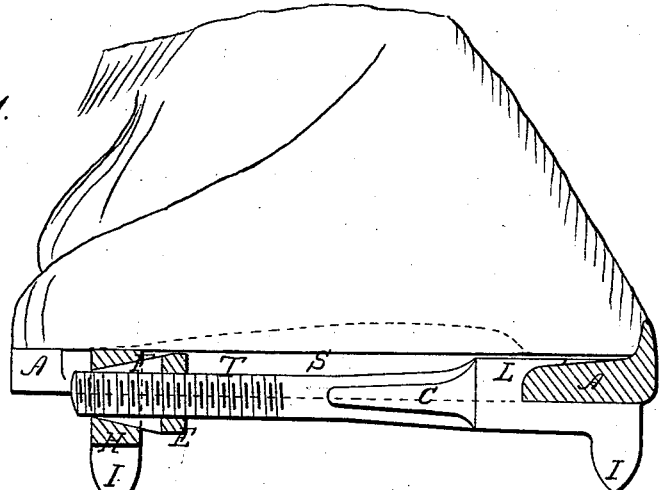
Figure 1 is a horizontal section, showing the improvement as applied to the shoe, and the shoe on the foot of the animal.
Figure 3:
Figure 3 is an end sectional view of conical screw-nut.
Figure 2:
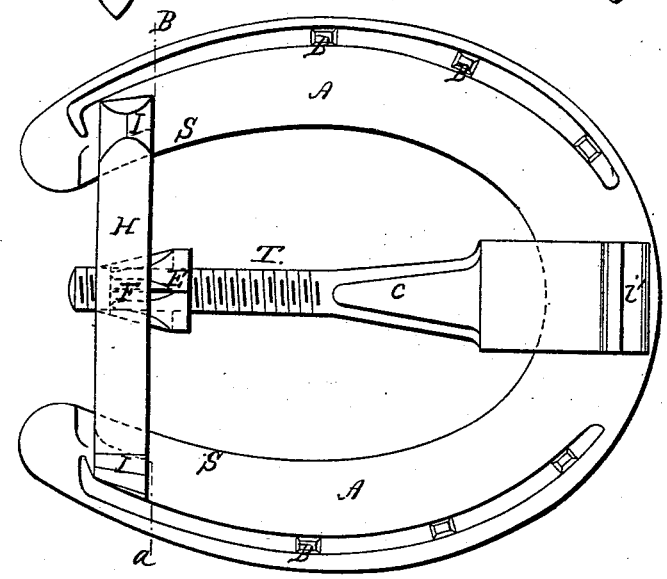
Figure 2 is a plan view of the under side of the shoe and improvement.

C is a longitudinal screw-bar, which is grooved at its forward end to fit on to or embrace the inner edge of the shoe within the groove, as seen at L in fig. 1.

Upon the rear end of this bar is cut a screw-thread, T, and upon which conical screw-nut E is made to operate; and upon the under side of the lower part of the bar C, and at its forward end, projects a calk, I'.

H is the cross or transverse bar. In the centre of its length is a conical hole to admit the bar C and conical screw-nut E.

Figure 4:
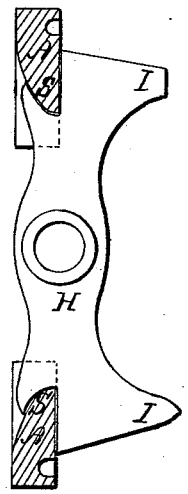
Figure 4 is a cross or transverse section of fig. 1.
Figure 5:
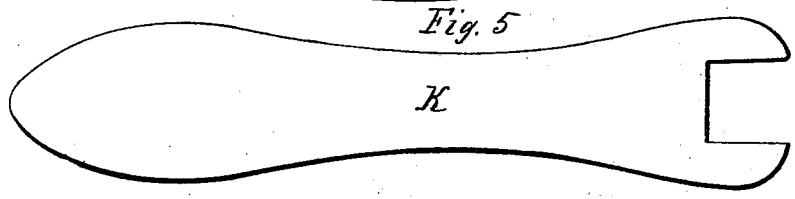
Figure 5 shows the wrench by which the screw-nut is turned.

Upon either end of this transverse bar is a calk, I, as seen in fig. 4.

Upon each end of bar H is a groove that embraces and slides upon the inner edge of shoe A.

The calks I and I' may be sharp, to prevent slipping on frozen ground and ice, or they may be flat, without coming to a point, or to a sharp edge, as shown at I, fig. 4.

K is a wrench to turn the nut E.

The conical nut E is split at its larger end to more than half its length, and tempered to a spring-temper. The object of this is to provide against the nut slipping upon bar C when the screw-threads are partially or wholly worn at the forward end of the nut, which is fully done by screwing the conical nut into the conical hole in bar H, and thus contracting the forward or large end of nut E upon the bar C, which will effectually hold it firm in place.

To apply my improvement to the shoe is simple and easy, and it is done by turning the screw-nut upon the bar C. Place bar H in position on the shoe; then insert the screw-end of bar C, with the nut E, into the conical hole in bar H, with the nut turned on the bar C far enough to allow the forward end of bar C to turn into position. When the nut E is turned, forcing bar C forward so that the groove will embrace the shoe in the groove, and so forcing bar C upon the inner edge of the shoe, the bar H is forced back upon the shoe, where the two sides are less distant apart, which tends at the same time to spread the shoe at the heel, instead of contracting the width of the shoe at the heel, which is a great advantage, as the tendency in shoeing, as commonly practised, is to contract instead of expand the shoe at the heel, and such expansion has a tendency to spread the hoof also, and keep the feet of the animal in proper condition.

I am aware that a somewhat similar device in construction has been used, such being shown in patent, No. 35,958, dated July 22, 1862; but its effects upon the shoe and foot of the animal are entirely different from mine, for in attaching the device to the shoe, the effect is to contract the shoe at the heel, which, in time, would be destructive to the foot of the animal, while mine is intended to act the reverse, and if not to expand, to prevent the contraction of the heel of the shoe.

I am also aware of patent, No. 47,242, dated April 11, 1865, which is for a false shoe, that fits within the inner diameter of the shoe, and a screw is used to expand or widen the shoe at the heel, and to prevent the foot from contracting. My construction is different from this, as this has no calks upon the devices that are distinct from the shoe.

Having thus described my improvement,

What I claim, and desire to secure by Letters Patent, is—

The combination of the screw-bar C with calk I', nut E, cross-bar H, having calks I I, with the shoe A, when constructed and arranged to operate together substantially in the manner and for the purpose described.

R. LAPORTÀ.

Witnesses:
S. SOLOMON,
F. SCHUBER.